(12) United States Patent
Lee

(10) Patent No.: US 9,650,975 B2
(45) Date of Patent: May 16, 2017

(54) METHOD AND CONTROLLER OF EXHAUST GAS RECIRCULATION TO PROTECT VALVE STICK

(71) Applicant: Hyundai Motor Company, Seoul (KR)

(72) Inventor: Ju-Kwang Lee, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 147 days.

(21) Appl. No.: 14/751,523

(22) Filed: Jun. 26, 2015

(65) Prior Publication Data

US 2016/0025043 A1 Jan. 28, 2016

(30) Foreign Application Priority Data

Jul. 22, 2014 (KR) ........................ 10-2014-0092528

(51) Int. Cl.
*F02D 41/00* (2006.01)
*F02D 41/22* (2006.01)
*F02M 26/23* (2016.01)

(52) U.S. Cl.
CPC ....... *F02D 41/0047* (2013.01); *F02D 41/221* (2013.01); *F02M 26/23* (2016.02); *Y02T 10/47* (2013.01)

(58) Field of Classification Search
CPC ... F02D 41/0047; F02D 41/221; F02M 26/25; F02M 26/26; F02M 26/50; F02M 26/02; F02M 26/04; F02M 26/33; F02M 26/22; F02M 26/28
See application file for complete search history.

(56) References Cited

FOREIGN PATENT DOCUMENTS

| JP | 2003-247459 A | 9/2003 |
|----|---------------|--------|
| JP | 2008-144609 A | 6/2008 |
| JP | 2009-191630 A | 8/2009 |
| JP | 2014-001681 A | 1/2014 |
| KR | 10-1229461 B1 | 1/2013 |

*Primary Examiner* — Hung Q Nguyen
*Assistant Examiner* — Xiao Mo
(74) *Attorney, Agent, or Firm* — Morgan Lewis & Bockius LLP

(57) ABSTRACT

A method of controlling an exhaust gas recirculation (EGR) system for preventing a valve from sticking may include performing, by an ECU, an EGR Cooler By-Pass Valve (ECB V/V) normal mode for operating an ECB V/V under a low temperature and low load condition to prevent fouling of an EGR cooler and overcooling of an EGR gas, when an EGR is controlled with a vehicle driven, and performing, by the ECU, an ECB V/V self-cleaning mode for operating an ECB V/V in consideration of an engine condition when the OFF-state of the ECB V/V is determined and an ECB V/V sticking detection mode for detecting sticking of the ECB V/V in continuous performing, cold performing, and in-driving performing in consideration of an opening amount of the ECB V/V when a fixed state of the ECB V/V is determined.

22 Claims, 15 Drawing Sheets

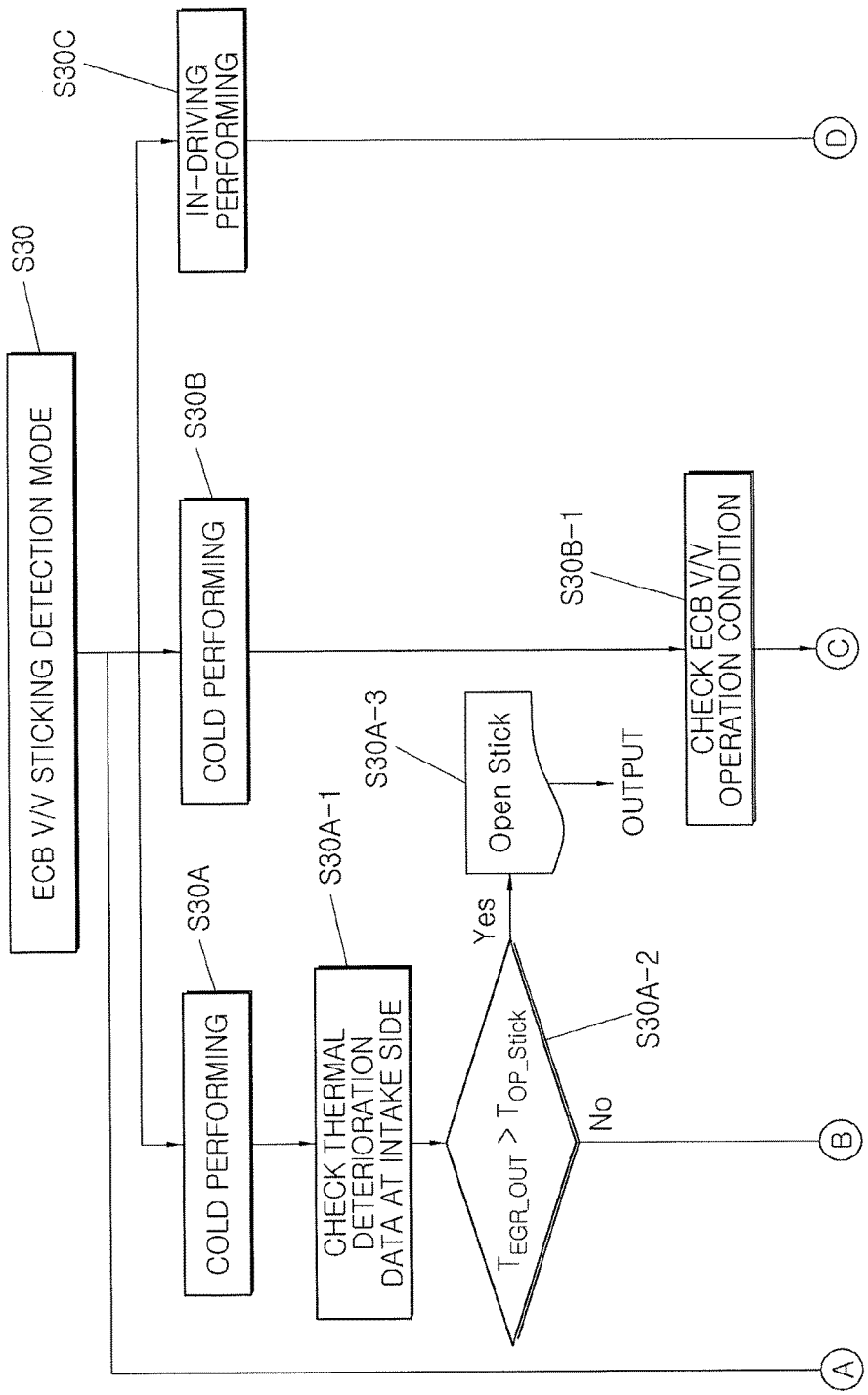

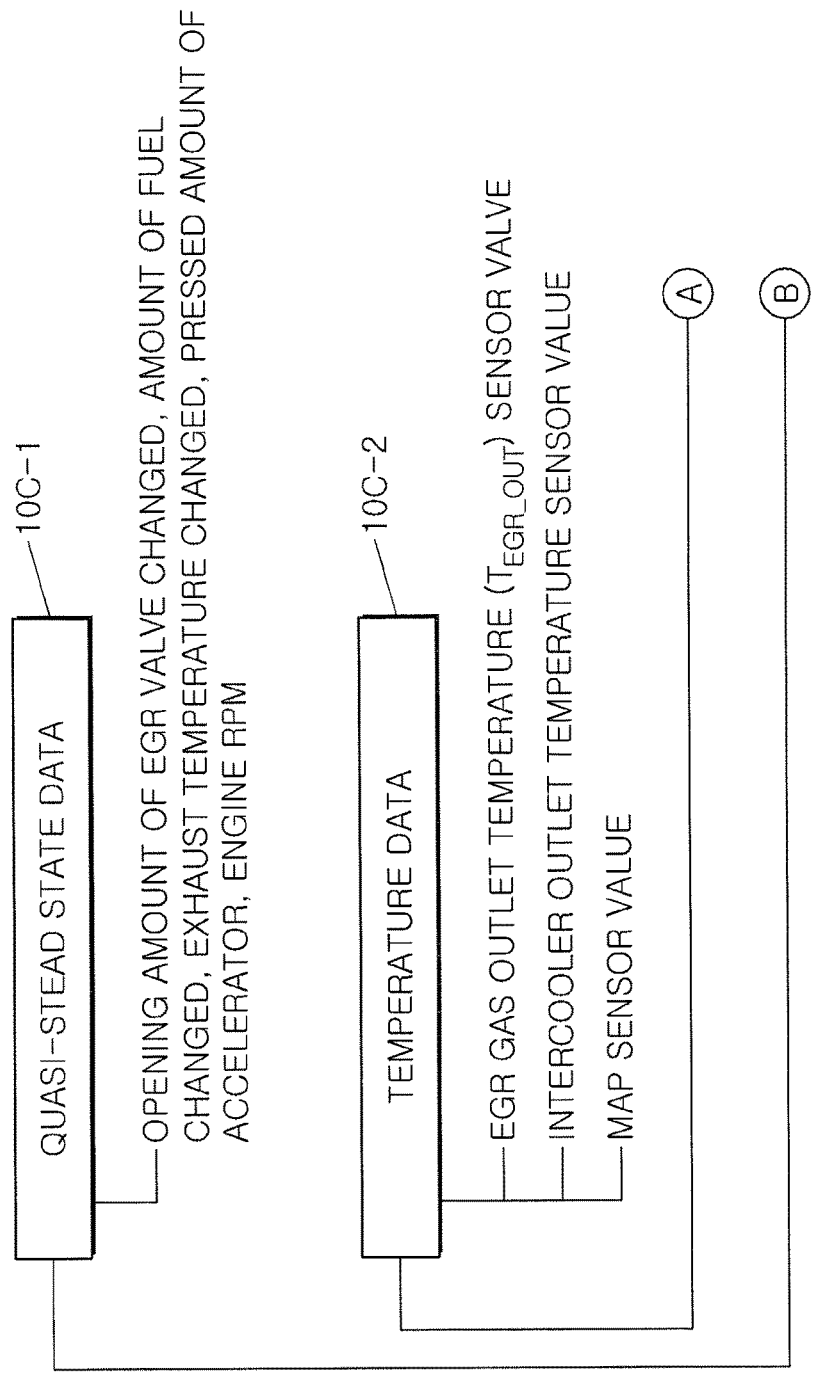

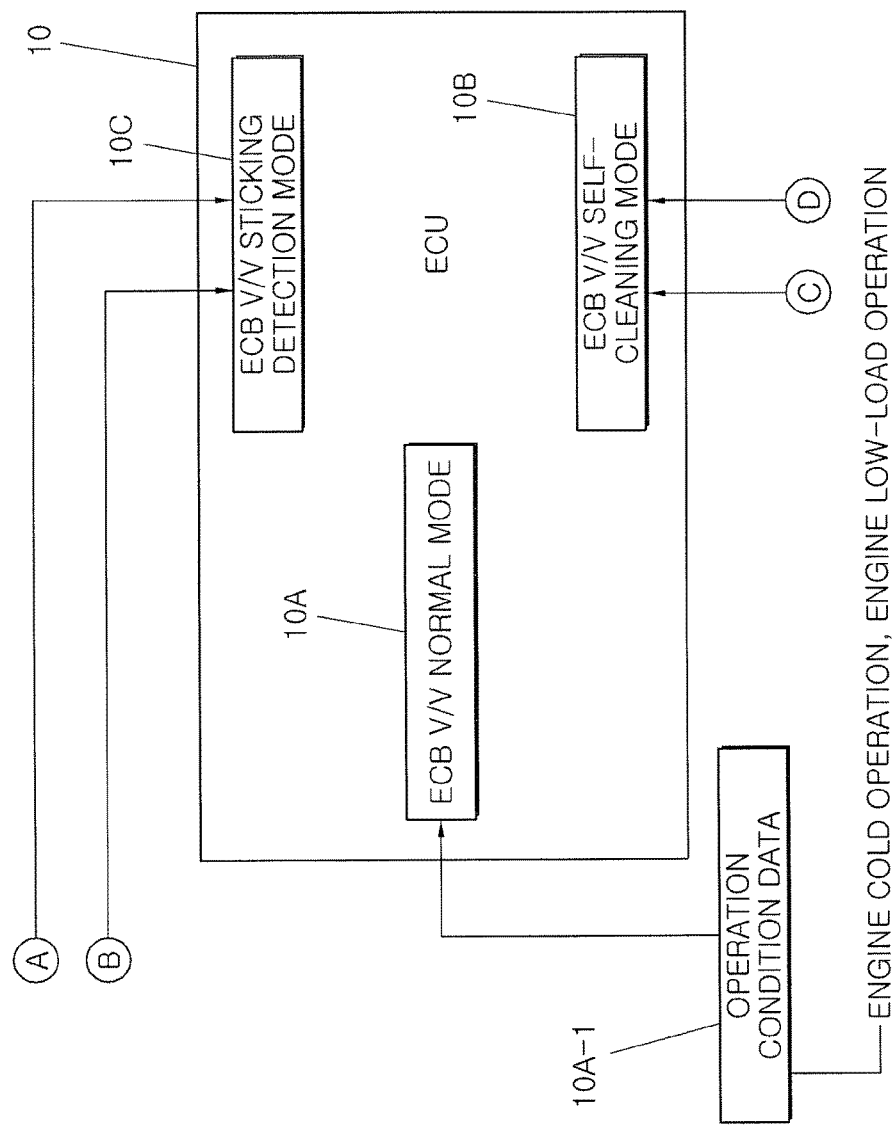

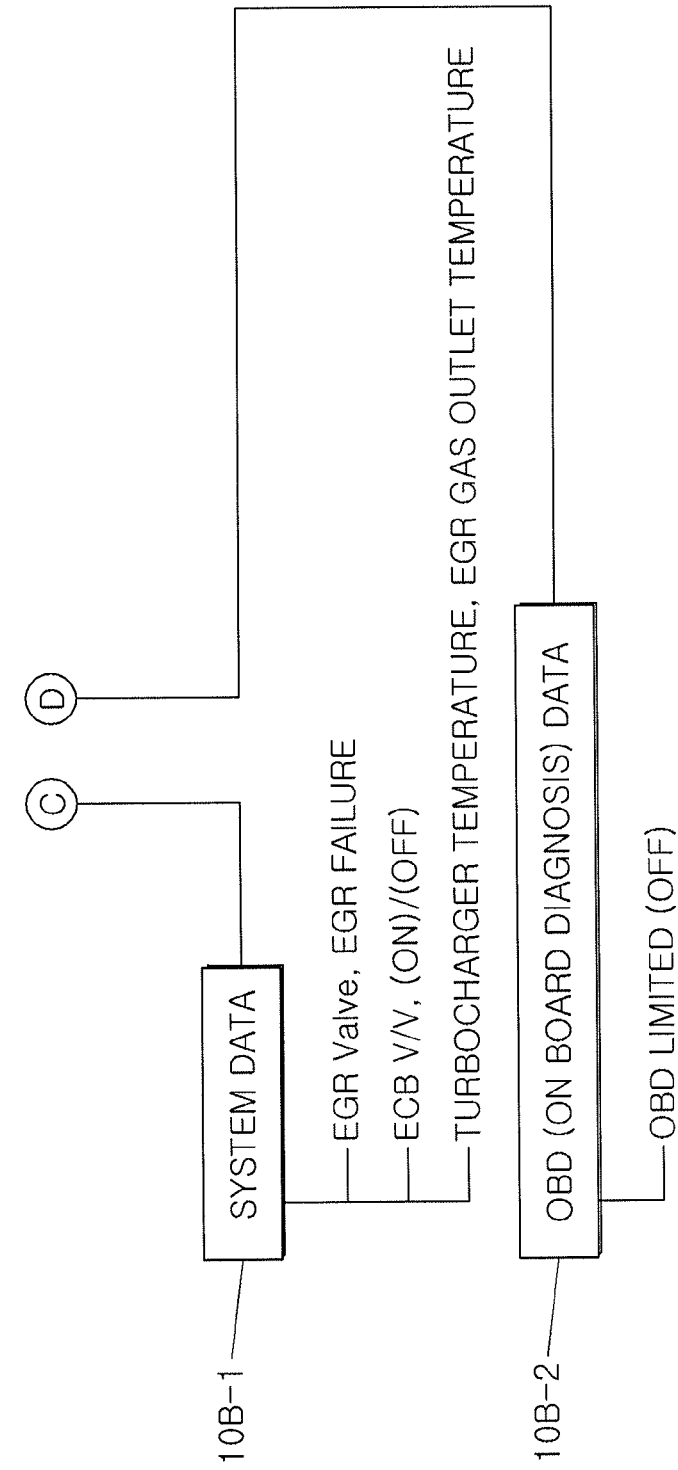

METHOD AND CONTROLLER OF EXHAUST GAS RECIRCULATION TO PROTECT VALVE STICK

CROSS-REFERENCE TO RELATED APPLICATIONS

The present application claims priority to Korean Patent Application No. 10-2014-0092528, filed Jul. 22, 2014, the entire contents of which is incorporated herein for all purposes by this reference.

BACKGROUND OF THE INVENTION

Field of the Invention

Various embodiments of the present invention relate to an exhaust gas recirculation system, and more particularly, to a method and a controller for an exhaust gas recirculation system for preventing a valve from sticking which solves the operation condition of an EGR cooler by-pass valve of which the operation is limited under low temperature (cold)/low load of an engine.

Description of Related Art

In general, when an exhaust gas recirculation system (hereafter, referred to as an EGR system) is used, forced intake air can be supplied to an engine by operating a turbocharger with an exhaust gas from the engine and some of the exhaust gas is returned to the engine, thereby further improving the performance of the engine.

Further, the EGR system can considerably contribute to reducing noxious components such as CO, HC, and NOx (nitrogen compound) in an exhaust gas. Accordingly, a diesel engine necessarily requires such an EGR system for reducing NOx. To this end, the EGR system includes an EGR line extending from the front end of the turbine in a turbocharger to an intake manifold, an EGR cooler, an EGR valve, and an EGR cooler by-pass valve (hereafter, referred to as an ECB V/V).

In those parts, the ECB V/V prevents fouling (deterioration of efficiency due to collection of carbon) of the EGR cooler and operates in accordance with engine accumulation for preventing overcooling of an EGR gas. For example, when a vacuum type ECB V/V starts operating in a normal state, a solenoid valve operates against the spring force of a governor keeping the ECB V/V closed, so the ECB V/V is turned on/off by a negative pressure of a vacuum pump.

As repetition of turning-on/off prevents the ECB V/V from sticking due to condensed water or carbon, so it is possible to prevent fouling (deterioration of efficiency due to accumulation of carbon) of the EGR cooler and the EGR gas from being overcooled.

The above information disclosed in this Background section is only for enhancement of understanding of the background of the invention and therefore it may contain information that does not form the prior art that is already known in this country to a person of ordinary skill in the art.

BRIEF SUMMARY

When a vehicle is driven, the ECB V/V cannot be free from the possibility of sticking due to freezing of condensed water or accumulation of carbon, because its operation condition is limited to low temperature (cold)/low load even if it is exposed to condensed water and carbon.

In particular, when there is a problem in the ECB V/V due to sticking, an EGR gas that has not passed through the EGR cooler is mixed with the intake air to be supplied to the engine, so NOx increases in an exhaust gas and the increase of NOx consequently make it difficult to satisfy the field In-use regulations.

Accordingly, the ECB V/V is required to periodically operate to prevent sticking that causes a problem with its operation, but the necessity of the ECB V/V is focused on preventing fouling of an EGR cooler and overcooling of an EGR gas at low temperature (cold)/low load, so the ECB V/V necessarily has difficulty in operating without influencing an EGR system under engine conditions other than low temperature (cold)/low load.

On the other hand, there is a method of using OBD (On Board Diagnosis) as a way of detecting failure of an EGR system without operating an ECB V/V under engine conditions other than low temperature (cold)/low load, but the OBD provides only an allowable temperature standard that limits the gas temperature at the outlet of an EGR system.

Accordingly, considering that the gas temperature at the outlet of an EGR system under engine conditions other than low temperature (cold)/low load is lower than allowable temperature, using the OBD fails to detect an operation problem in an ECB V/V due to sticking.

According to various aspects of the present invention, a method of controlling an exhaust gas recirculation (EGR) system for preventing a valve from sticking may include performing, by an ECU, an EGR Cooler By-Pass Valve (ECB V/V) normal mode for operating an ECB V/V under a low temperature and low load condition to prevent fouling of an EGR cooler and overcooling of an EGR gas, when an EGR is controlled with a vehicle driven, and performing, by the ECU, an ECB V/V self-cleaning mode for operating an ECB V/V in consideration of an engine condition when the OFF-state of the ECB V/V is determined and an ECB V/V sticking detection mode for detecting sticking of the ECB V/V in continuous performing, cold performing, and in-driving performing in consideration of an opening amount of the ECB V/V when a fixed state of the ECB V/V is determined.

The engine condition may be an engine operation period other than the low temperature and low load condition, and a change in temperature of cooling water and a change of an amount of fuel may be included in determining the engine condition.

An opening state of the ECB V/V may be divided into a condition for applying the continuous performing type when the ECB V/V is fixed in the open state, a condition for applying the cold performing when the ECB V/V is fixed in a closed state or the ECB V/V is not operated, and a condition for applying the in-driving performing when the ECB V/V is fixed at a middle position.

A result of the continuous performing may be determined by an open sticking for preventing thermal deterioration at an intake side, a result of the cold performing type may be defined by closed sticking for preventing the fouling of the EGR cooler, and the result of the in-driving performing may be defined by middle sticking for limiting engine output.

The ECB V/V normal mode may include repeating turning on/off the ECB V/V, operating a solenoid valve of the ECB V/V, and stopping after a normal mode setting condition is reached, in which the reaching the normal mode setting condition may be determined by a time for maintaining the low temperature and low load condition determined on a basis of the temperature of cooling water and the amount of fuel.

The ECB V/V self-cleaning mode may include satisfying a first necessary condition by checking turning-off of the ECB V/V, satisfying a second necessary condition by checking whether operation is limited by at least one of whether the ECB V/V sticking detection mode is performed, a failure of EGR hardware, and a limit of On Board Diagnosis (OBD), performing an automatic ECB V/V self-cleaning mode after checking a third necessary condition for checking whether the ECB V/V self-cleaning mode is automatically operated, under a condition that temperature of a gas is not rapidly increased at an outlet of the EGR cooler even if the ECB V/V is operated, and performing a forcible ECB V/V self-cleaning mode after checking a fourth necessary condition for checking whether the ECB V/V self-cleaning mode is forcibly operated due to accumulation of operation conditions, when whether the ECB V/V self-cleaning mode is operated is not checked.

In the satisfying the second necessary condition, whether the ECB V/V sticking detection mode is operated may be determined after it is performed one time, on the basis of lapse of time or a driving distance after the operation, the failure of EGR hardware may be determined on the basis of a failure in the EGR valve, and the limit of the OBD may be determined on the basis of a high temperature signal at the inlet of a turbocharger and an EGR gas outlet, or an OFF-state of the OBD.

The lapse of time after operation may be 15 minutes, the driving distance after operation may be 40 km, and the temperature at the inlet of a turbocharger and an EGR gas outlet may be 200 degrees or more.

The temperature of the gas may not be rapidly increased at the outlet of the EGR cooler even when the ECB V/V is operated includes an opening amount of 0% with the EGR valve turned off, operation of a brake, and coasting, and a gap of the automatic operation may be set in a time unit of seconds.

In the performing the automatic ECB V/V self-cleaning mode after checking the third necessary condition, the ECB V/V self-cleaning mode may include repeating turning on/off the ECB V/V, operating a solenoid valve of the ECB V/V, and stopping after a normal mode setting condition is reached, in which a time of the reaching of the normal mode setting condition is determined in a unit of seconds and the time is two seconds.

The accumulation of operation conditions may include lapse of time or a driving distance, the lapse of time may be 15 to 20 minutes, and the driving distance may be 50 km.

In the performing the forcible ECB V/V self-cleaning mode after checking the fourth necessary condition, a forcible ECB V/V self-cleaning mode may include repeating turning on/off the ECB V/V, operating a solenoid valve of the ECB V/V, and stopping after a normal mode setting condition is reached, wherein the reaching the normal mode setting condition is determined in a time unit of minutes or a driving distance, the minute may be 15 to 20 minutes, and the driving distance may be 50 km.

The continuous performing of the ECB V/V sticking detection mode may detect an EGR gas outlet temperature, determine thermal deterioration at an intake side when the EGR gas outlet temperature is greater than a temperature of determining open sticking, and provide an open sticking signal to the ECU or turns on a check lamp when thermal deterioration at an intake side is determined.

The EGR gas outlet temperature may be provided from a temperature sensor value at the outlet of the EGR gas, or provided from a temperature value estimated from an intercooler outlet temperature sensor value stored as ECU data or a MAP sensor value.

The cold performing of the ECB V/V sticking detection mode may detect an EGR gas outlet temperature, determine there is a possibility of fouling of the EGR cooler, when the EGR gas outlet temperature is greater than a temperature of determining closed sticking, and provide a closed sticking signal to the ECU or turns on a check lamp when the fouling of the EGR cooler is determined.

The EGR gas outlet temperature may be provided from an EGR gas outlet temperature sensor value or provided from a temperature value estimated from an intercooler outlet temperature sensor value stored as ECU data or a MAP sensor value, and the temperature of determining closed sticking may be determined from temperature of cooling water, intake temperature, engine load, or an amount of fuel, an opening amount of EGR (%), and a turbocharger inlet temperature.

The in-driving performing of the ECB V/V sticking detection mode may check an operation condition, determine that an engine is in a quasi-steady state, check the operation state of the ECB V/V for a predetermined time $t_{op}$ when the quasi-steady state is satisfied, check whether it is in the quasi-steady state after checking the operation state of the ECB V/V, check a temperature change from a temperature difference before and after the ECB V/V is operated, on a basis of a temperature difference before and after the ECB V/V is operated being greater than a reference temperature before and after the ECB V/V is operated, when the quasi-steady state is maintained, and provide a middle sticking signal to the ECU or turns on a check lamp, when the temperature difference before and after the ECB V/V is operated is checked.

In the determining a quasi-steady state, a change (%) of the opening amount of an EGR valve, a change in an amount of fuel, a change in exhaust temperature, a change in a pressed amount of an accelerator pedal, a change in RPM of an engine, a change in temperature of cooling water, a braking state of a vehicle, a limit (OFF) of OBD, and an EGR gas outlet temperature may be included, the predetermined time $t_{Op}$ may be in a unit of seconds, and an RPM of the engine, the temperature of cooling water, an engine load, an EGR use condition, operation of the ECB V/V, and the exhaust temperature may be used for determining the reference temperature before and after the ECB V/V is operated.

In the checking whether it is in the quasi-steady state after checking the operation state of the ECB V/V, when the quasi-steady state is not maintained, determination of the quasi-steady state may be reattempted in a unit of minutes, and when a temperature change is checked on the basis of the temperature difference before and after the ECB V/V is operated, a delay time may be applied.

According to various aspects of the present invention, a controller for an exhaust gas recirculation system for preventing a valve from sticking nay include an EGR Cooler By-Pass Valve (ECB V/V) normal mode performing device for operating an ECB V/V under a low temperature and low load condition to prevent fouling of an EGR cooler and overcooling of an EGR gas, when an EGR (Exhaust Gas Recirculation) is controlled with a vehicle driven, an ECB V/V self-cleaning mode performing device for operating an ECB V/V in consideration of an engine condition when an OFF-state of the ECB V/V is determined, and an ECB V/V sticking detection mode performing device for detecting sticking of the ECB V/V in the types of continuous performing, cold performing, and in-driving performing in consideration of the opening amount of the ECB V/V when a fixed state of the ECB V/V is determined.

The ECB V/V normal mode performing device may be configured to receive the temperature of cooling water and the amount of fuel for determining a cold/low load condition of the engine; the ECB V/V self-cleaning mode performing device may be configured to receive system data including an operation signal of an EGR valve, temperature of a turbocharger, EGR gas outlet temperature, an operation signal of an ECB V/V, and a failure of EGR, and OBD data including a limit (OFF) of OBD, and the ECB V/V sticking detection mode performing device may be configured to determine open sticking, close sticking, and middle sticking according to a fixed state of the ECB V/V, using quasi-stead state data of an engine operation condition to which a change (%) in the opening amount of an EGR valve, a change in the amount of fuel, a change in exhaust gas, a change in the pressed amount of an accelerator pedal, a change in RPM of an engine, and a change in temperature of cooling water are applied, and temperature data, and the open sticking may indicate that the ECB V/V is open and fixed, the close sticking may indicate that the ECB V/V is closed and stuck, or not operated, and the middle sticking may indicate that the ECB V/V is fixed at a middle position.

The controller may be an Engine Control Unit (ECU) for controlling an engine.

According to the present invention, the ECB V/V for preventing fouling an EGR cooler and overcooling of an EGR gas is operated only under low (cold)/low load and periodically operated, so that it is possible to prevent the EGR V/V from sticking due to condensed water or carbon, and particularly, as the ECB V/V is prevented from sticking, it is possible to improve reliability of hardware protected from thermal deterioration at the intake side and satisfy the regulations under field In-use.

Further, according to the present invention, the operation condition of the ECB V/V out of the low temperature (cold)/low load condition is widened without exclusive hardware such as a position sensor, it is possible to improve the performance of the EGR system without an additional cost.

Further, since turning on/off the ECB V/V is divided into an ECB V/V normal mode according to a low temperature (cold)/low load condition and an ECB V/V self-cleaning mode according to general engine conditions, it is possible to improve the performance of the EGR system with the ECB V/V without influencing the operational performance of the ECB V/V. In particular, since the driver or the ECU for controlling engine recognizes the information about sticking of the ECB V/V in the ECB V/V sticking detection mode for the fixed state of the ECB V/V, it is possible to minimize an abnormal engine operation condition, and particular, since the ECU limits output or the opening amount of the EGR system under an abnormal engine operation condition, so hardware is protected and poor EM (Emission) is prevented.

Further, since the ECU performs the ECB V/V normal mode, the ECB V/V self-cleaning mode, and ECB V/V sticking detection mode in connection with the information on an engine and an EGR system, it is possible to considerably improve the usability of the ECU and the performance of the EGR system.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6A, FIG. 6B and FIG. 6C are a flowchart illustrating an ECB V/V sticking detection mode for detecting sticking of an ECB V/V, when the ECB V/V is fixed, according to the present invention.

FIG. 9A, FIG. 9B and FIG. 9C are diagrams illustrating the configuration of a controller for an exhaust gas recirculation system for preventing a valve from sticking according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Figure 1:
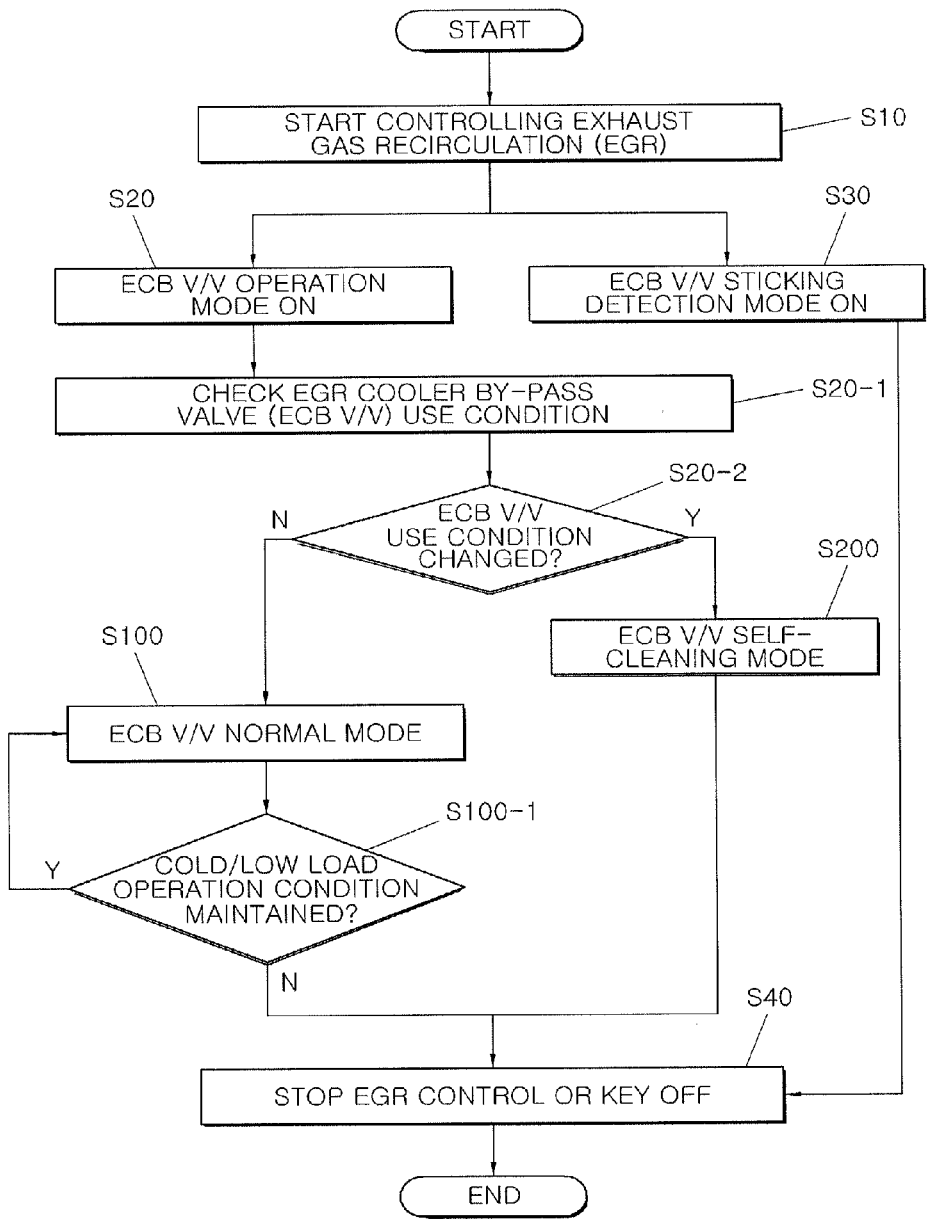
FIG. 1 is a flowchart illustrating an exemplary method of controlling an exhaust gas recirculation system for preventing a valve from sticking according to the present invention.

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a flowchart illustrating a method of controlling an exhaust gas recirculation system (EGR) for preventing a valve from sticking according to various embodiments of the present invention. The EGR system is controlled by an EGR controller or an engine control unit (or electronic control unit) (hereafter, referred to as an ECU).

As in the step (S10), when a key is turned on an On-position and an engine is started, the EGR system is also operated and the operation of the EGR is controlled by a method of preventing an EGR valve from sticking. The method of preventing an EGR valve from sticking includes controlling of parts relating to an EGR system including an EGR valve and an EGR cooler, and controlling an EGR cooler by-pass valve (ECB V/V) normal mode, an ECB V/V self-cleaning mode, and an ECB V/V sticking detection mode, which will be described below. The various embodiments relate to the ECB V/V normal mode, ECB V/V self-cleaning mode, and ECB V/V sticking detection mode, so other control modes the same as common EGR control are not described herein.

When the EGR control is started, an ECB V/V operation mode in the step (S20) and an ECB V/V sticking detection mode in the step (S30) are both executed. The ECB V/V operation mode is divided into the ECB V/V normal mode considering a low temperature (cold)/low load condition, as in the step (S100), and the ECB V/V self-cleaning mode considering general engine conditions, as in the step (S200), whereas a fixed state of the ECB V/V is considered in the ECB V/V sticking detection mode.

The ECB V/V normal mode, the ECB V/V self-cleaning mode, and the ECB V/V sticking detection mode are stopped, when the EGR control is stopped, as in the step (S40), or the key is turned to the Off-position, and when they are stopped, the method of preventing an EGR valve from sticking is reset to the initial state.

In particular, the ECB V/V normal mode (S100) and the ECB V/V self-cleaning mode in the ECB V/V operation mode (S20) are discriminated, that is, an ECB V/V use condition is checked, as in the step (S20-1), and then a change in the ECB V/V use condition is determined, as in the step (S20-2). Accordingly, the ECB V/V normal mode (S100) is started when there the ECB V/V use condition is not changed, and whether to stop of mode is determined on the basis of whether it keeps operating under a cool/low load operation condition, as in the step (S100-1). In contrast, the ECB V/V self-cleaning mode (S200) is started, when the ECB V/V use condition is changed.

Figure 2:
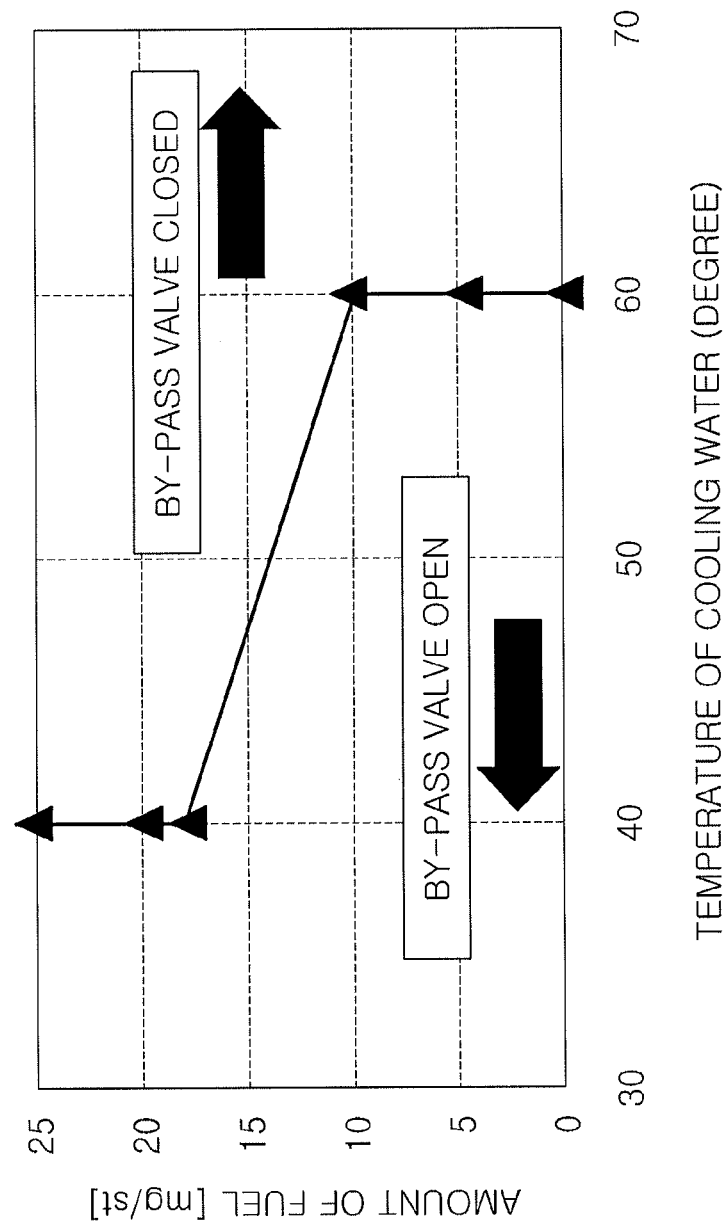
FIG. 2 is a diagram showing an exemplary use conditions for opening/closing an ECB V/V during anti-sticking control according to the present invention.

In various embodiments, the ECB V/V use condition is exemplified in FIG. 2. As shown in the figure, the ECB V/V use condition includes the temperature of cooling water and the amount of fuel, a change of the ECB V/V use condition is determined on the basis of a change of the temperature of cooling water or a change of the amount of fuel, and the change of the temperature of cooling water or the change of the amount of fuel leads the ECB V/V to be turned on (or opened) or turned off (or closed). Turning-on (opening) of the ECB V/V means the ECB V/V normal mode (S100), while the turning-off (closing) of the ECB V/V means the ECB V/V self-cleaning mode (S200).

Figure 3:
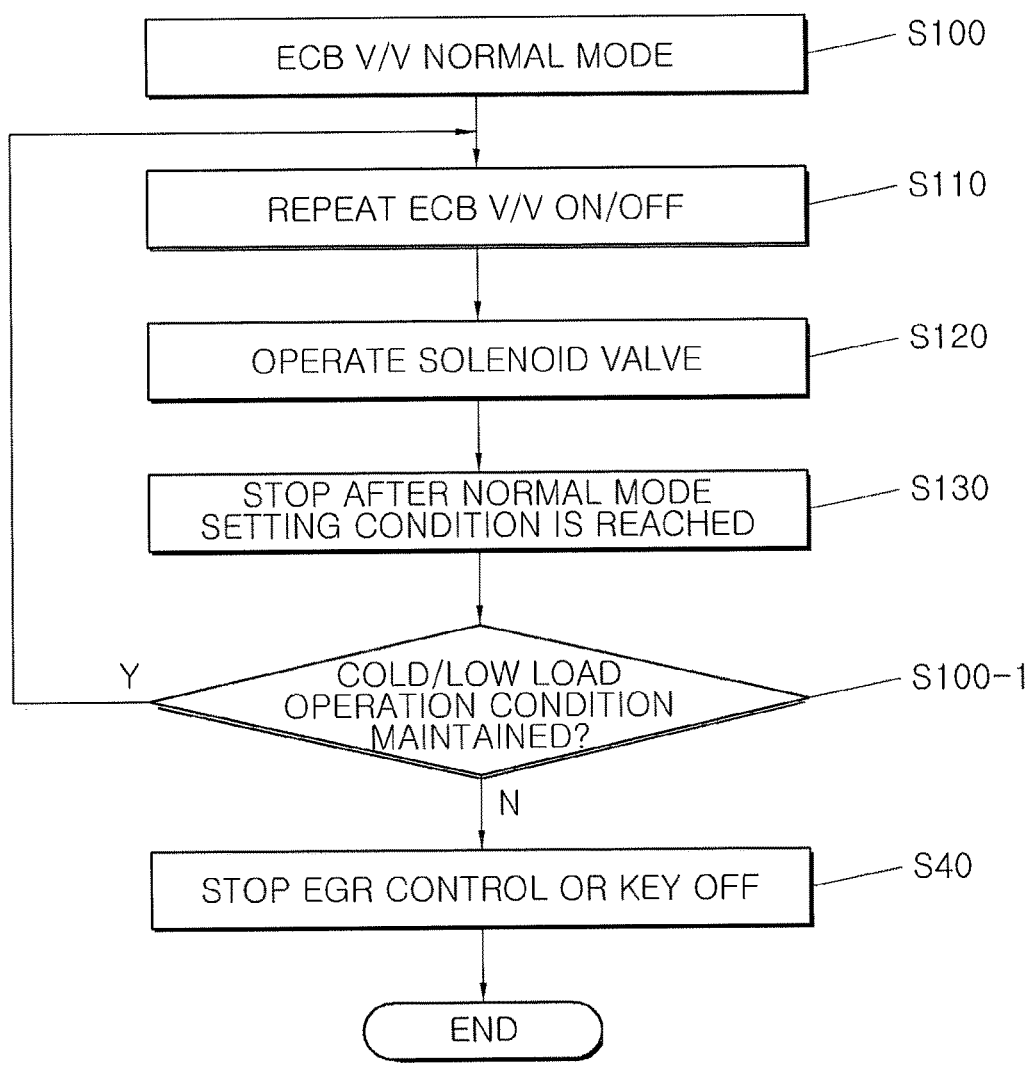
FIG. 3 is a flowchart illustrating an ECB V/V normal mode in which an ECB V/V operates under the condition of low temperature (cold)/low load according to the present invention.

FIG. 3 shows an operation process of the ECB V/V normal mode for controlling the ECB V/V under a low temperature (cold)/low load condition. In the ECB V/V normal mode, the ECB V/V is controlled by an EGR controller or an ECU.

The ECB V/V normal mode in the step (S100) includes repeating turning on/off the ECB V/V (S110), operating a solenoid valve (S120), stopping after a normal mode setting condition is satisfied (S130), and stopping the ECB V/V normal mode (S100-1).

In detail, output for repeating turning on/off the ECB V/V in the step (S110) is based on the temperature of cooling water and a fuel amount curve (FIG. 2). Operating the solenoid valve in the step (S120) is performed, when the ECB V/V is turned on. For example, when it is a vacuum type ECB V/V, the solenoid valve is turned on/off by a negative pressure from a vacuum pump against a spring force of a governor keeping the ECB V/V closed, and the ECB V/V is repeatedly turned on/off by the turning-on/off the solenoid valve. Accordingly, in the EGR system controlled under the low temperature (cold)/low load condition, fouling of the EGR cooler and overcooling of the EGR gas are prevented by the operation of the ECB V/V. The stopping after the normal mode setting condition is satisfied in the step (S130) is determined on the basis of the time for keeping the low temperature (cold)/low load condition, which depends on the specifications of the engine and the EGR system. Thereafter, whether to stop the ECB V/V normal mode is determined on the basis of whether to keep the cool/low load operation condition in the step (S100-1).

The step (S40) shows that the EGR control has been stopped or the key has been turned to the Off-position, which means that maintaining the cool/low load operation condition is not required in the step (S100-1).

Figure 4A:
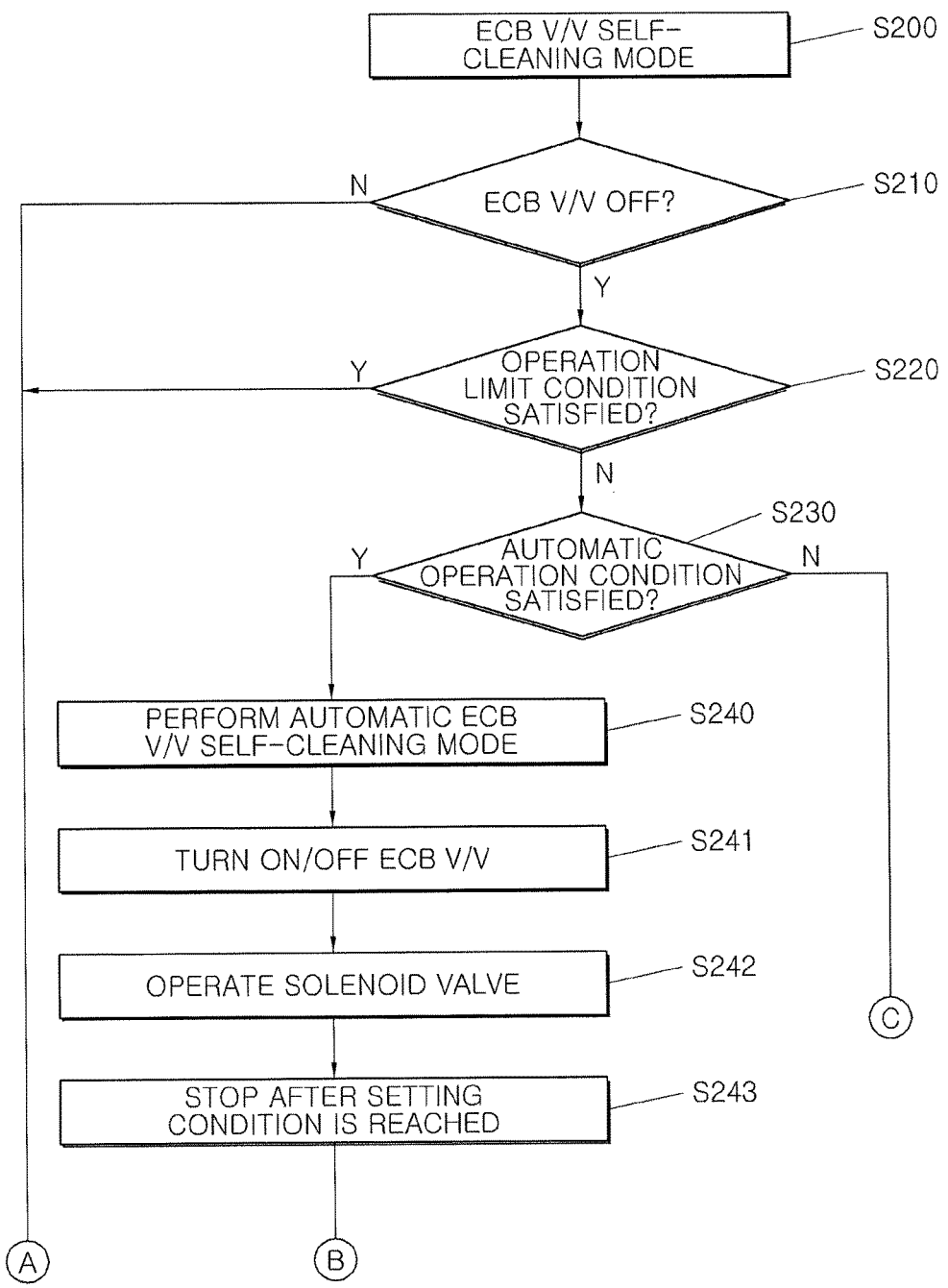
FIG. 4A and FIG. 4B are a flowchart illustrating a self-cleaning mode of an ECB V/V in which an ECB V/V is operated under general engine conditions according to the present invention.
Figure 4B:
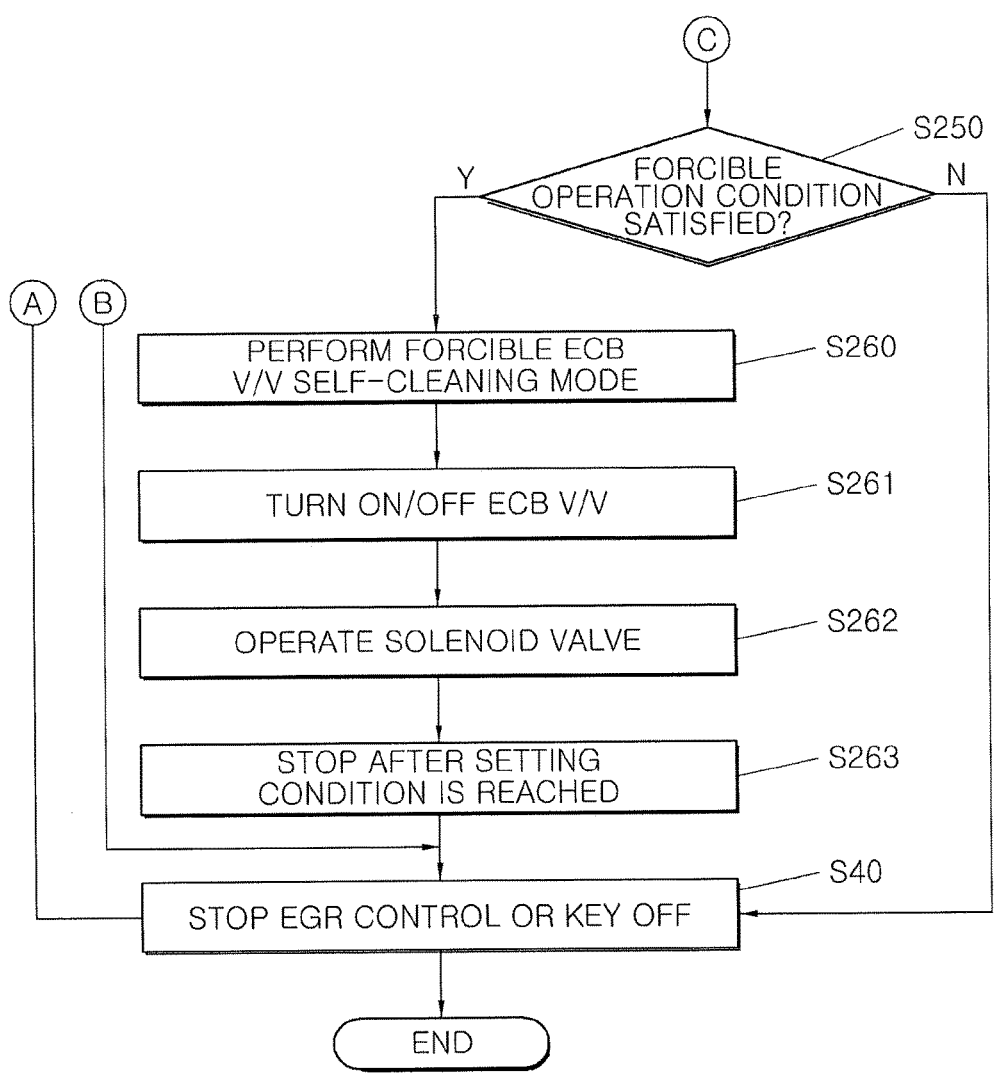

FIG. 4A and FIG. 4B show the operation process of the ECB V/V self-cleaning mode (S200) for controlling the ECB V/V under general engine conditions. In the ECB V/V self-cleaning mode, the ECB V/V is controlled by an EGR controller or an ECU.

The ECB V/V self-cleaning mode in the step (S200) is includes checking whether the ECB V/V is turned off (S210), checking an operation limiting condition (S220), checking the self-operating condition (S230), performing an automatic ECB V/V self-cleaning mode (S240), checking a forcible operation mode (S250), and a forcible ECB V/V self-cleaning mode (S260).

In detail, in the step (S210), it is determined that the ECB V/V is turned off, that is, it is closed, so first necessary condition for performing the ECB V/V self-cleaning mode is satisfied. Accordingly, the first necessary condition is determined as turning-off of the ECB V/V or closing of the ECB V/V.

Figure 5:
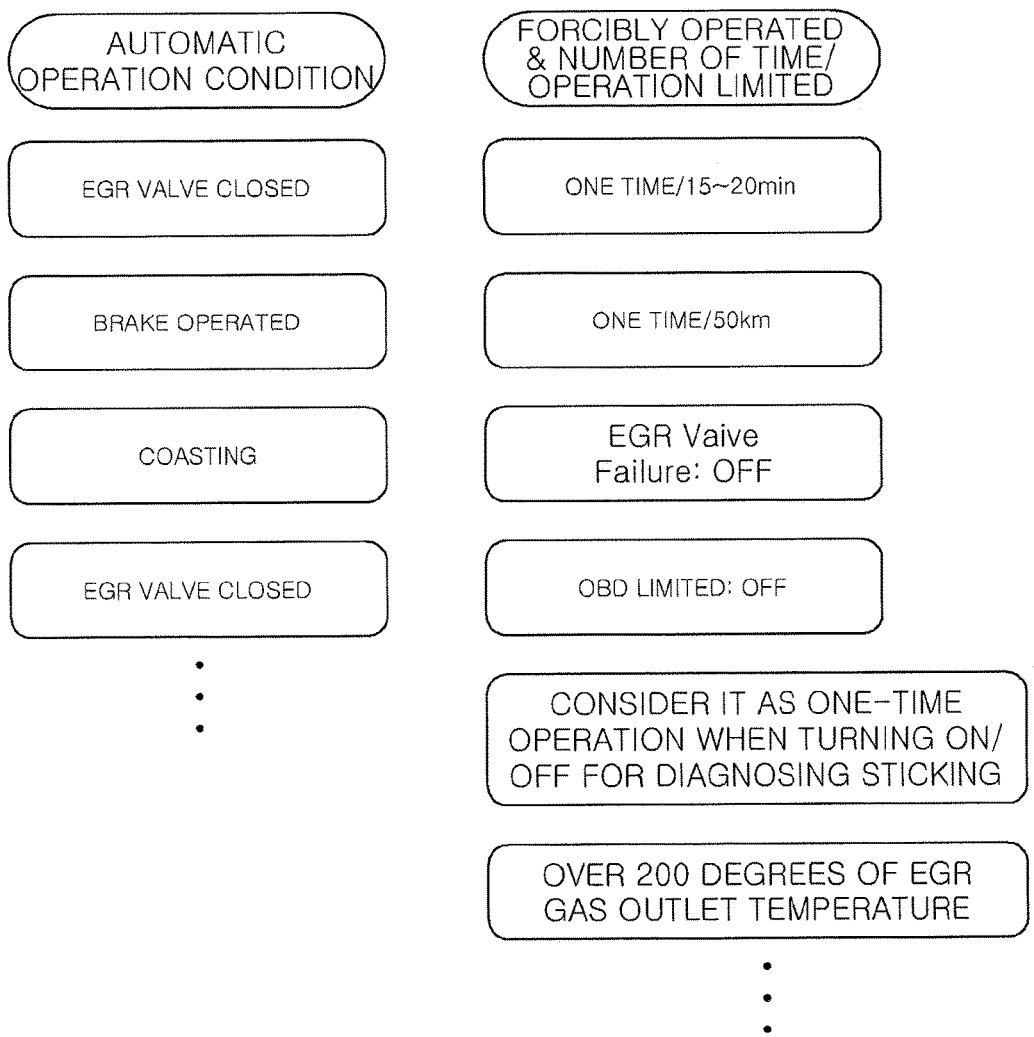
FIG. 5 is a diagram showing examples of an automatic operation condition, a forcible operation condition, and an operation limiting condition in the self-cleaning mode of an ECB V/V according to the present invention.

Next, whether to limit the operation is checked in the step (S220), a second necessary condition for performing the ECB V/V self-cleaning mode is satisfied. Whether to limit the operation is exemplified in FIG. 5. As shown in the figure, for whether to limit the operation, the ECB V/V sticking detection mode, the EGR system, and the OBD are used. For example, for one time of the ECB V/V sticking detection mode, lapse of time (for example, 15 minutes passed) after operation or a driving distance (for example, 40 km) is used. The EGR system uses failure in hardware including the EGR valve. For the OBD, the temperature at the inlet of a turbocharger and the high temperature (for example, over 200 degrees) at an EGR gas outlet, or limit of the OBD is used. Therefore, the second necessary condition is determined by the number of operation of the ECB V/V stick detection mode, a failure in EGR hardware, high temperature information of the OBD, or a limit of the OBD.

Next, whether to automatically operate is checked in the step (S230), a third necessary condition for performing the ECB V/V self-cleaning mode is satisfied. Whether to automatically operate is exemplified in FIG. 5. As shown in the figure, in the checking of whether to automatically operate, there is no rapid increase in temperature of a gas at the EGR cooler outlet even if the ECB V/V is operated, and zero % of opening (closing) with the EGR valve turned off, operation of a brake, and coasting are included. Accordingly, the third necessary condition is determined by zero % of opening (closing) with the EGR valve turned off, operation of a brake, and coasting. The automatic ECB V/V self-cleaning mode by the third necessary condition is performed for around 2 seconds.

In detail, when the automatic ECB V/V self-cleaning mode of the step (S240) is performed on the basis of the third necessary condition, the ECB V/V is repeatedly turned on/off, as in the step (S241), and the solenoid valve is operated when the ECB V/V is turned on, as in the step (S242). For example, when it is a vacuum type ECB V/V, the solenoid valve is turned on/off by a negative pressure from a vacuum pump against a spring force of a governor keeping the ECB V/V closed, and the ECB V/V is repeatedly turned on/off by the turning-on/off the solenoid valve. Accordingly, since the ECB V/V is operated even if the low temperature (cold)/low load condition is not satisfied, the possibility of sticking of the ECB V/V due to condensed water and carbon can be removed.

Next, after a set condition is reached, as in the step (S243), the automatic ECB V/V self-cleaning mode is stopped, and to this end, the set condition is two seconds. The stopping of the automatic ECB V/V self-cleaning mode means that the EGR control is stopped in the step (S40), or the key is turned to the Off-position.

On the other hand, whether to forcibly operate is checked in the step (S250), a fourth necessary condition for performing the ECB V/V self-cleaning mode is satisfied. Whether to forcibly operate is exemplified in FIG. 5. As shown in the figure, whether to forcibly operate is based on accumulation of operation conditions such as lapse of time (for example, 15 to 20 minutes) or a diving distance (for example, 50 km). Therefore, the fourth necessary condition is defined by accumulation of operation conditions.

In detail, when the forcible ECB V/V self-cleaning mode of the step (S260) is performed on the basis of the fourth necessary condition, the ECB V/V is repeatedly turned on/off, as in the step (S261), and the solenoid valve is operated when the ECB V/V is turned on, as in the step (S262). For example, when it is a vacuum type ECB V/V, the solenoid valve is turned on/off by a negative pressure from a vacuum pump against a spring force of a governor keeping the ECB V/V closed, and the ECB V/V is repeatedly turned on/off by the turning-on/off the solenoid valve. Accordingly, since the ECB V/V is operated even if the low temperature (cold)/low load condition is not satisfied, the possibility of sticking of the ECB V/V due to condensed water and carbon can be removed.

Next, after a set condition is reached, as in the step (S263), the forcible ECB V/V self-cleaning mode is stopped, and to this end, the set condition is lapse of 15 to 20 minutes or a driving distance of 50 km. The stopping of the forcible ECB V/V self-cleaning mode means that the EGR control is stopped in the step (S40), or the key is turned to the Off-position.

Figure 6B:
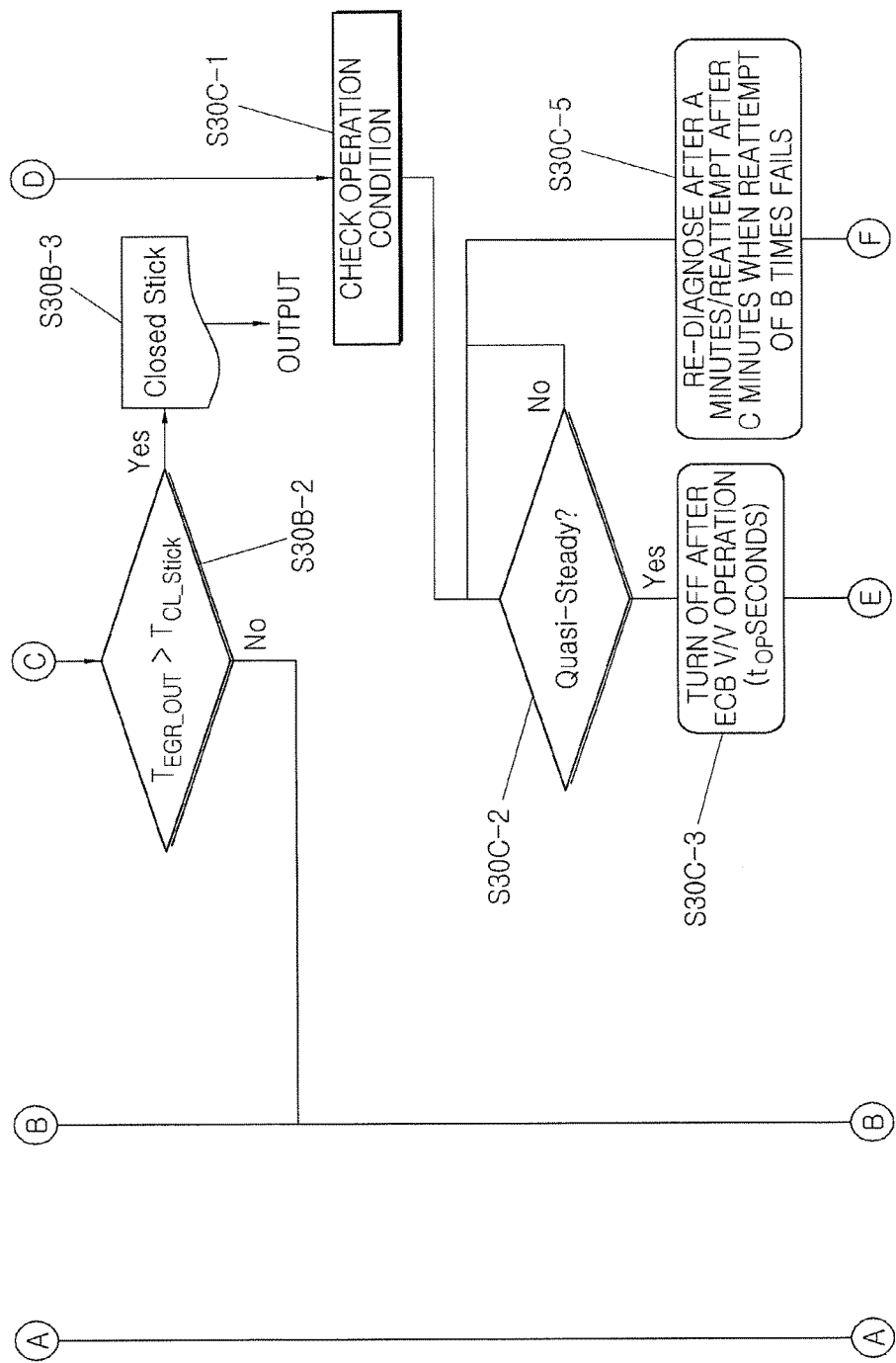
Figure 6C:
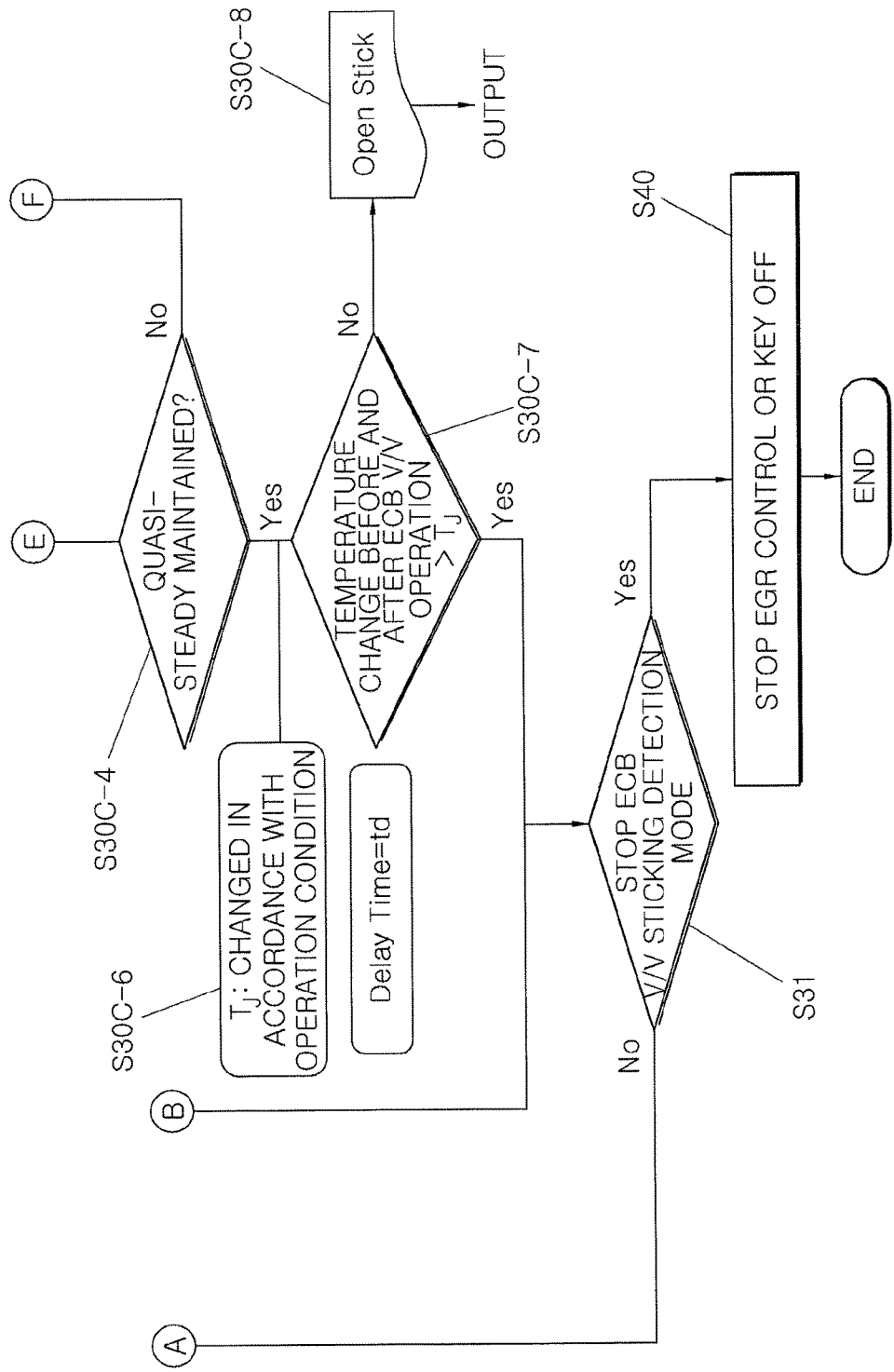

FIG. 6A, FIG. 6B and FIG. 6C show the process of the ECB V/V sticking detection mode (S30) for controlling the ECB V/V in a fixed state. In the ECB V/V sticking detection mode, the ECB V/V is controlled by an EGR controller or an ECU.

As shown in the figure, the ECB V/V sticking detection mode of the step (S30) is kept performed (S30A), cold-performed (S30B), and performed in driving (S30C).

The keeping performing of the step (S30A) includes checking data of thermal deterioration at the intake side of the step (S30A-1), determining temperature of step (S30A-2), and determining open sticking (hereafter O_sticking) of the step (S30A-3). In particular, the O_sticking means that the ECB V/V is open, so it should be kept monitored while the engine is operated.

In detail, the data of thermal deterioration at the intake side of the step (S30A-1) may be the temperature of an EGR gas ($T_{EGR\_OUT}$) at the outlet. The temperature of an EGR gas ($T_{EGR\_OUT}$) is provided from a temperature sensor of an EGR gas at the outlet. However, when there is no temperature sensor of an EGR gas at the outlet, the temperature is temperature expected by a temperature sensor at the intercooler outlet or an MAP sensor, which is stored as ECU data. In the step (S30A-2), it is determined whether the temperature of an EGR gas ($T_{EGR\_OUT}$) is larger than open sticking determination temperature ($T_{Op\_Stick}$). This is because the thermal deterioration at the intake side is generated at temperature $T_{EGR\_OUT}$ higher than temperature $T_{Op\_Stick}$.

Accordingly, the 0_sticking in the step (S30A-3) determines that TEGR_OUT is larger than $T_{OP\_Stick}$. In the O_sticking, a signal provided to the ECU or turning on a check lamp is output. The ECU receiving a signal of O_sticking limits output for preventing thermal deterioration at the intake side by recognizing sticking and the check lamp turned on in response of the signal of O_sticking leads Call-In of a driver. In contrast, when the temperature $T_{EGR\_OUT}$ is not higher than the temperature $T_{Op\_Stick}$ in the step (S30A-2), the ECB V/V sticking detection mode keeps performed unless it is stopped, as in the step (S31). When the ECB V/V sticking detection mode is stopped, EGR control is stopped in the step (S40), or the key is turned to the Off-position.

The cold-performing of the step (S30B) includes checking the ECV V/V operation condition (S30B-1), determining temperature (S30B-2), and closing stick (hereafter, referred to as C_sticking) (S30B-3). In particular, the C_sticking means that the ECB V/V is closed and fixed or not operated, so it should be kept monitored in cold operating.

Figure 7:
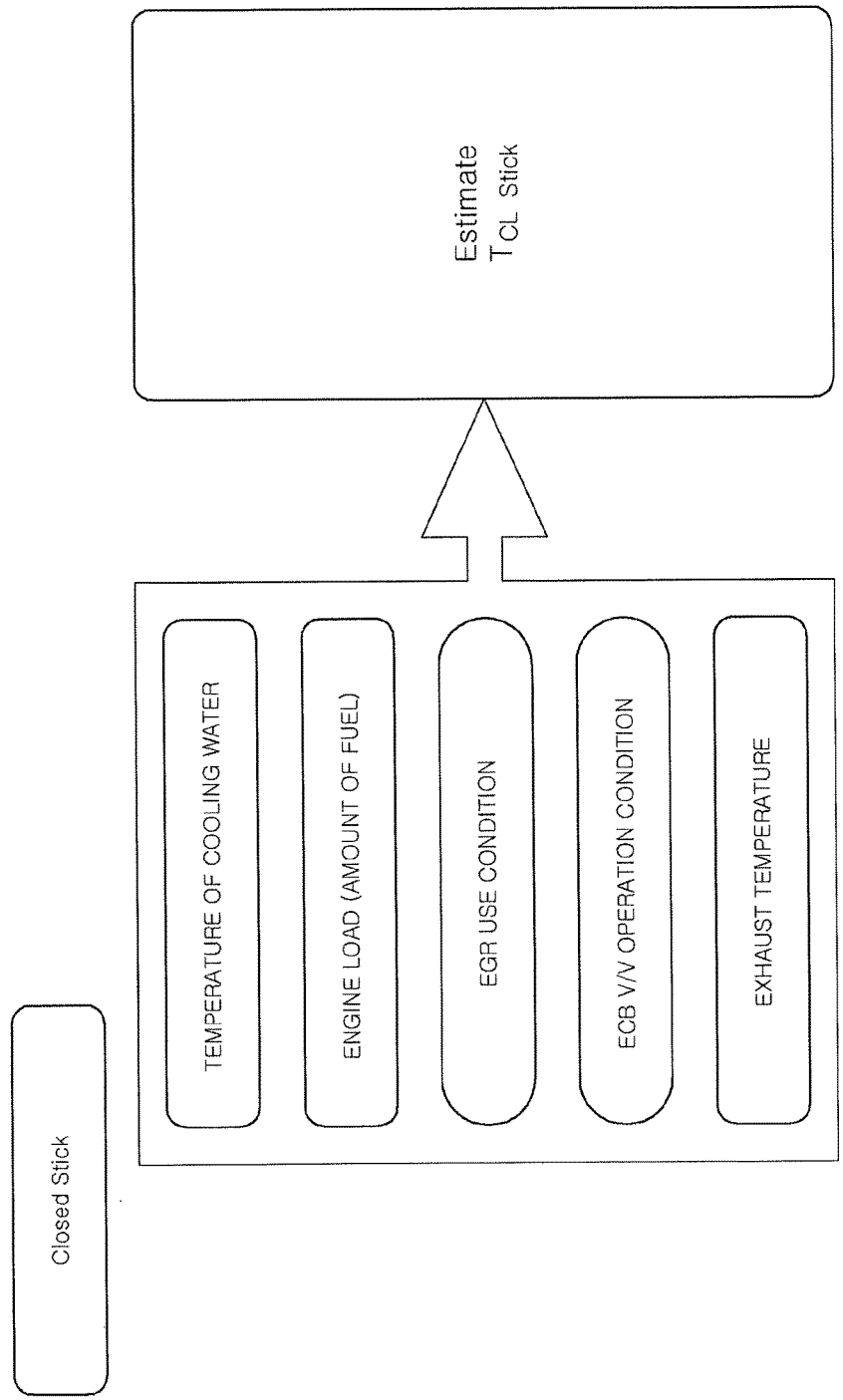
FIG. 7 is a diagram showing an example of a closed sticking condition in the ECB V/V sticking detection mode according to the present invention.

In detail, the ECV V/V operation condition of the step (S30B-1) is fouling of the EGR cooler that causes excess of EM (Emission), and to this end, the EGR gas outlet temperature ($T_{EGR\_OUT}$) is used. The temperature of an EGR gas ($T_{EGR\_OUT}$) is provided from a temperature sensor of an EGR gas at the outlet. However, when there is no temperature sensor of an EGR gas at the outlet, the temperature is temperature expected by a temperature sensor at the intercooler outlet or an MAP sensor, which is stored as ECU data. In the step (S30B-2), it is determined whether the temperature of an EGR gas ($T_{EGR\_OUT}$) is smaller than closed sticking determination temperature (Tst_Closed). This is because fouling of the EGR cooler is generated at temperature $T_{EGR\_OUT}$ lower than the temperature Tst_Closed, in which an example of information for calculating the temperature Tst_Closed is shown in FIG. 7. As shown in the figure, the necessary information is the temperature of cooler, the temperature of intake air, the engine load (the amount of fuel), the opening amount (%) of the EGR, and the temperature at the inlet of a turbocharger, and the temperature Tst_Closed where fouling of the EGR cooler is generated is calculated on this information.

Accordingly, the C_sticking in the step (S30B-3) determines that $T_{EGR\_OUT}$ is smaller than the temperature $T_{st\_Closed}$. In the C_sticking, a signal provided to the ECU or turning on a check lamp is output. The ECU receiving the signal C_Stick causes sticking, so a measurement for preventing fouling of the EGR cooler is made and the check lamp turned on in response of the signal C_Stick leads Call-In of the driver. In contrast, when the temperature $T_{EGR\_OUT}$ is not higher than the temperature $T_{Op\_Stick}$ in the step (S30A-2), the ECB V/V sticking detection mode keeps performed unless it is stopped, as in the step (S31). When the ECB V/V sticking detection mode is stopped, EGR control is stopped in the step (S40), or the key is turned to the Off-position.

The performing in driving of the step (S30C) includes checking the operation condition (S30C-1), determining a quasi-steady (hereafter, referred to as Q_S) state, checking the operation of the ECB V/V (S30C-3), checking maintenance of the Q_S state (S30C-4), reattempting to check the Q_S (S30C-5), delaying time (S30C-6), checking a temperature change (S30C-7), and determining middle sticking (hereafter, referred to as M_Stick) (S30C-8). In particular, the performing in driving (S30C) is applied only one time during driving of a vehicle, but may be applied two times, if necessary. In particular, the M_Stick means that the ECB V/V is fixed at the middle position, so it should be monitored one time during driving.

In detail, for the operation condition of the step (S30C-1), the Q_S of the step (S30C-2) is used, and determining of the M_Stick (S30C-8) is limited to the case when the Q_S is satisfied. This is because the temperature $T_{EGR\_OUT}$ increases not only during operation of the ECB V/V, but under a changed operation condition. The Q_S is exemplified in FIG. 8. As shown in FIG. 8, for determining the Q_S, a change (%) of the opening amount of the EGR valve, a change in the amount of fuel, a change in exhaust temperature, a change in the pressed amount of an accelerator pedal, a change in RPM of the engine, and a change in temperature of cooling water, and the Q_S of the step (S30C-2) is determined generally in consideration of those factors. Further, for determining the _QS, the braking state of a vehicle, a limit of the OBD (OFF), and a change in $T_{EGR\_OUT}$ may be included.

The operation state of the ECB V/V of the step (S30C-3) is checked on the basis of turning-on/off the ECB V/V that is performed for a predetermined time ($t_{Op}$) in the Q-S state. The $t_{Op}$ is in the unit of seconds. Next, whether the Q_S state is maintained (S30C-4) is determined, and then when the Q_S state is not maintained, reattempting to determining the Q_S is performed (S30C-5), or when the Q_S state is maintained, checking a change in temperature (S30C-7) is performed.

Figure 8A:
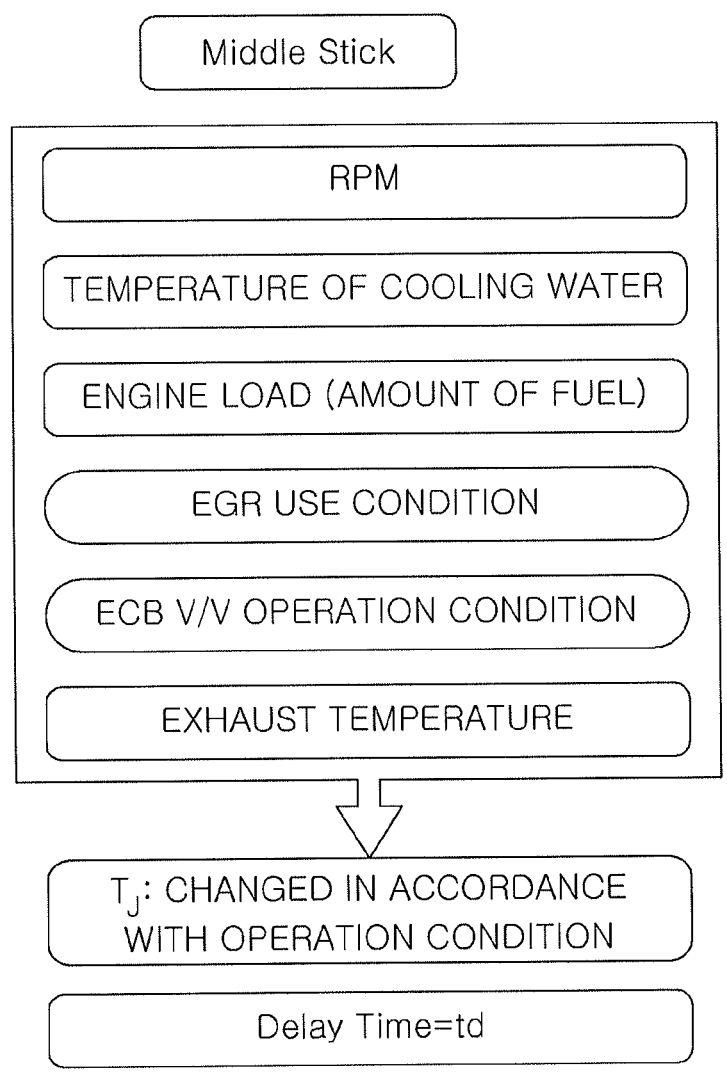
FIG. 8A and FIG. 8B are diagrams showing an example of a middle sticking condition and a quasi-steady condition in the ECB V/V sticking detection mode according to the present invention.
Figure 8B:
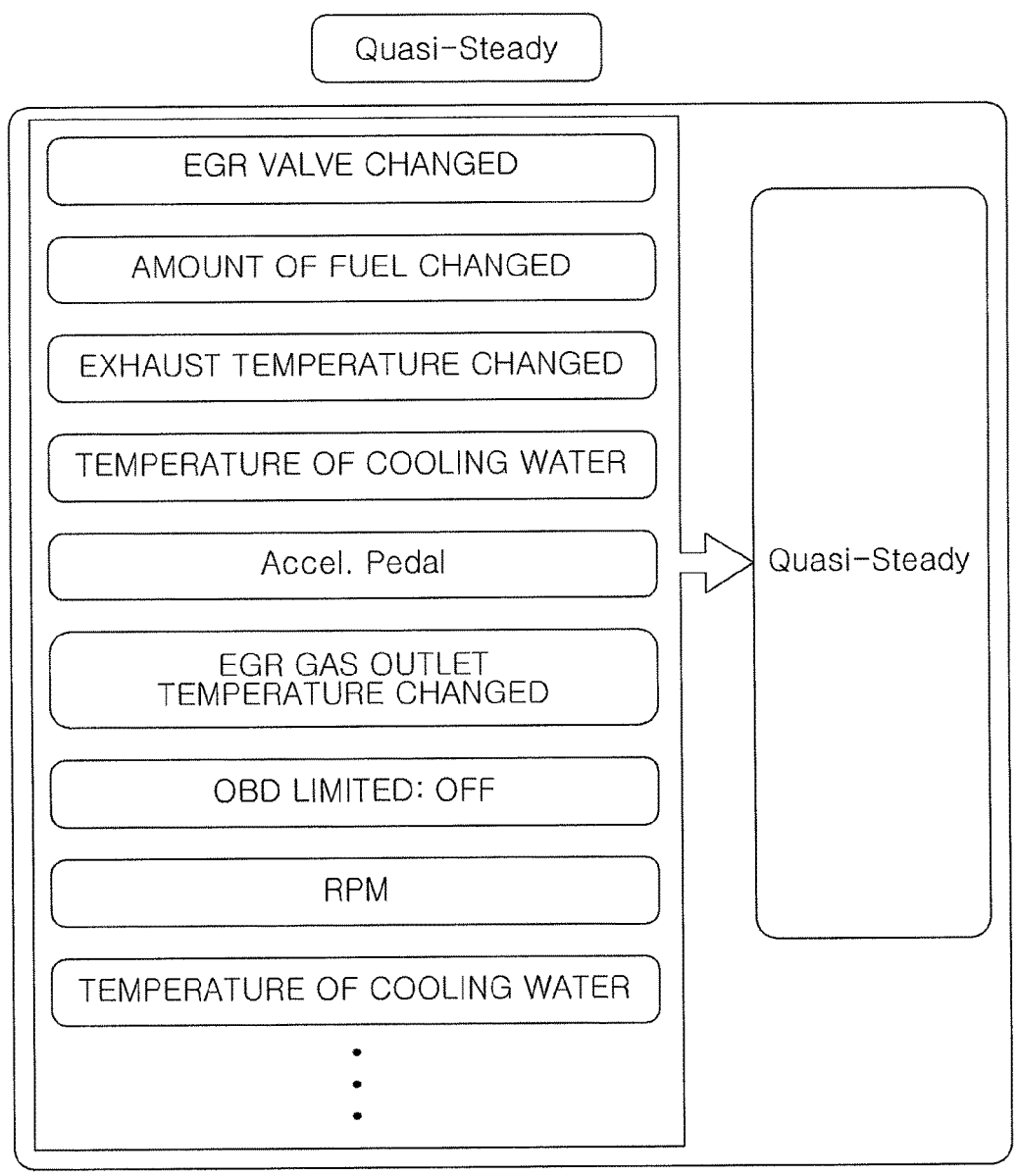

The reattempting of the Q_S (S30C-5) is performed in the unit of minutes. For example, the Q_S is diagnosed again B times after A minutes from when it is determined that the Q_S is not maintained, and then when reattempting is failed, it is reattempted after C minutes. The change in temperature (S30C-7) is determined on the basis of a change in temperature before and after the operation of the ECB V/V performed in the step (S30C-3), and for the temperature change condition, a temperature change (ΔT) before and after the operation of the ECB V/V>a reference temperature ($T_J$) before and after the operation of the ECB V/V. The determination of $\Delta T > T_J$ in the step (S30C-7) is made after the delay time (td) is applied, as in the step (S30C-6). The reason of applying the delay time (td) is because the maximum temperature after the operation of the ECB V/V is measured after the ECB V/V is closed. An example of setting the reference temperature $T_J$ is shown in FIG. 8A and 8B. As shown in the figure, the RPM of the engine, the temperature of cooling water, the engine load, the use conditions of the EGR, the operation of the ECB V/V, and the exhaust temperature are considered to set the reference temperature $T_J$, and the reference temperature $T_J$ is calculated from those factors.

The middle stick (hereafter, M_stick) in the step (S30C-8) is determined on the basis of $\Delta T > T_J$. In the M_Stick, a signal provided to the ECU or turning on a check lamp is output. The ECU receiving a signal of M_Stick limits engine output by recognizing sticking and the check lamp turned on in response of the signal of M_Stick leads Call-In of a driver. In contrast, when $\Delta T > T_J$ is not satisfied in the step (S30C-7), the ECB V/V sticking detection mode keeps being performed unless it is stopped, as in the step (S31). When the ECB V/V sticking detection mode is stopped, EGR control is stopped in the step (S40), or the key is turned to the Off-position.

FIG. 9A, FIG. 9B and FIG. 9C are diagrams illustrating the configuration of a controller for an exhaust gas recirculation system for preventing a valve from sticking according to various embodiments of the present invention.

As shown in FIG. 9A-FIG. 9C, the controller 10 includes an ECB V/V normal mode performing unit 10A, an ECB V/V self-cleaning mode performing unit 10B, and an ECB V/V sticking detection mode performing unit 10C. In particular, the controller 10 controls the EGR valve, the EGR cooler, the EGR cooler by-pass valve (hereafter, ECB V/V) of the exhaust gas recirculation (hereafter, referred to as EGR) system, and its control logic includes an ECB V/V normal mod under a low temperature (cold)/low load condition, an ECB V/V self-cleaning mode under generation conditions, an ECB V/V sticking detection mode under an ECB V/V fixing condition.

To this end, the ECB V/V normal mode performing unit 10A determines the low temperature (cold)/low load condition using operation condition data 10A-1. The operation condition data 10A-1 includes the temperature of cooling water and the amount of fuel from which it is possible to determine cold/low load of the engine and they are detected by sensors in the engine and the EGR system.

The ECB V/V self-cleaning mode performing unit 10B determines the general operation conditions using system data 10B-1 and OBD (On Board Diagnosis) data 10B-2. The system data 10B-1 includes an operation signal of the EGR valve, the temperature of the turbocharger, the temperature the EGR gas at the outlet, the operation signal of the ECB V/V, and a failure of the EGR system. The OBD data 10B-2 means limit (OFF) of the OBD.

The ECB V/V sticking detection mode performing unit 10C determines open sticking, closed sticking, and middle sticking according to the fixed state of the ECB V/V using quasi-steady state data 10C-1 and temperature data 10C-2. The open sticking means that the ECB V/V is open and fixed, so the ECB V/V sticking detection mode performing unit 10C keeps monitoring while the engine is operated. The closed sticking means that the ECB V/V is closed and fixed or not operated, so the ECB V/V sticking detection mode performing unit 10C keeps monitoring during cold operation. The middle sticking means that the ECB V/V is fixed at the middle position, so the ECB V/V sticking detection mode performing unit 10C performs monitoring one time in driving.

In various embodiments, the ECB V/V normal mode performed by the ECB V/V normal mode performing unit 10A, the ECB V/V self-cleaning mode performed by the ECB V/V self-cleaning mode performing unit 10B, and the ECB V/V sticking detection mode performed by the ECB V/V sticking detection mode performing unit 10C are the same as the performing conditions and performing processes of the modes described with reference to FIGS. 1 to 8. In particular, the controller 10 may be a controller only for controlling the EGR system, but it may be an engine control unit or an electronic control unit.

As described above, in the control of an exhaust gas recirculation system for preventing a valve from sticking according to various embodiments, when the EGR (Exhaust Gas Recirculation) is controlled with a vehicle driven, the ECB V/V normal mode for operating the ECB V/V (EGR Cooler By-Pass Valve) under a low temperature and low load condition is performed to preventing fouling of the EGR cooler and overcooling of the EGR gas. Further, when the EGR control is continued, the ECB V/V self-cleaning mode for operating the ECB V/V in consideration of the engine condition when the OFF-state of the ECB V/V is determined and the ECB V/V sticking detection mode for detecting sticking of the ECB V/V in the types of continuous performing, cold performing, and in-driving performing in consideration of the opening amount of the ECB V/V when the fixed state of the ECB V/V when a fixed state of the ECB V/V is determined, are performed. Accordingly, the operation area of the ECB V/V for preventing fouling (deterioration of efficiency due to accumulation of carbon) of the EGR cooler and overcooling of the EGR gas is widened, and particular, sticking of the ECB V/V is prevented, so that it is possible to improve reliability of hardware protected from thermal deterioration at the intake side and satisfy the regulations under field In-use.

The foregoing exemplary embodiments are only examples to allow a person having ordinary skill in the art to which the present invention pertains (hereinafter, referred to as "those skilled in the art") to easily practice the present invention. Accordingly, the present invention is not limited to the foregoing exemplary embodiments and the accompanying drawings, and therefore, a scope of the present invention is not limited to the foregoing exemplary embodiments. Accordingly, it will be apparent to those skilled in the art that substitutions, modifications and variations can be made without departing from the spirit and scope of the invention as defined by the appended claims and can also belong to the scope of the present invention.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling an exhaust gas recirculation (EGR) system for preventing a valve from sticking, the method comprising:
    performing, by an Engine Control Unit (ECU), an EGR Cooler By-Pass Valve (ECB V/V) normal mode for operating an ECB V/V under a low temperature and low load condition to prevent fouling of an EGR cooler and overcooling of an EGR gas, when an EGR is controlled with a vehicle driven; and
    performing, by the ECU, an ECB V/V self-cleaning mode for operating the ECB V/V in consideration of an engine condition when an OFF-state of the ECB V/V is determined and an ECB V/V sticking detection mode for detecting sticking of the ECB V/V in continuous performing, cold performing, and in-driving performing in consideration of an opening amount of the ECB V/V when a fixed state of the ECB V/V is determined.

2. The method of claim 1, wherein the engine condition is an engine operation period other than the low temperature and low load condition, and a change in temperature of cooling water and a change of an amount of fuel are included in determining the engine condition.

3. The method of claim 1, wherein an opening state of the ECB V/V is divided into a condition for applying a continuous performing type when the ECB V/V is fixed in the open state, a condition for applying the cold performing when the ECB V/V is fixed in a closed state or the ECB V/V is not operated, and a condition for applying the in-driving performing when the ECB V/V is fixed at a middle position.

4. The method of claim 1, wherein a result of the continuous performing is determined by an open sticking for preventing thermal deterioration at an intake side, a result of a cold performing type is defined by closed sticking for preventing the fouling of the EGR cooler, and the result of the in-driving performing is defined by middle sticking for limiting engine output.

5. The method of claim 1, wherein the ECB V/V normal mode includes:
    repeating turning on/off the ECB V/V; operating a solenoid valve of the ECB V/V; and
    stopping after a normal mode setting condition is reached, wherein the reaching the normal mode setting condition is determined by a time for maintaining the low temperature and low load condition determined on a basis of the temperature of cooling water and the amount of fuel.

6. The method of claim 1, wherein the ECB V/V self-cleaning mode includes:
    satisfying a first necessary condition by checking turning-off of the ECB V/V;
    satisfying a second necessary condition by checking whether operation is limited by at least one of whether the ECB V/V sticking detection mode is performed, a failure of EGR hardware, and a limit of On Board Diagnosis (OBD):
    performing an automatic ECB V/V self-cleaning mode after checking a third necessary condition for checking whether the ECB V/V self-cleaning mode is automatically operated, under a condition that temperature of a gas is not rapidly increased at an outlet of the EGR cooler even when the ECB V/V is operated; and
    performing a forcible ECB V/V self-cleaning mode after checking a fourth necessary condition for checking whether the ECB V/V self-cleaning mode is forcibly operated due to accumulation of operation conditions, when whether the ECB V/V self-cleaning mode is operated is not checked.

7. The method of claim 6, wherein in the satisfying the second necessary condition, whether the ECB V/V sticking detection mode is operated is determined after it is performed one time, on a basis of lapse of time or a driving distance after the operation, the failure of EGR hardware is determined on a basis of a failure in the EGR valve, and a limit of the OBD is determined on a basis of a high temperature signal at an inlet of a turbocharger and an EGR gas outlet, or an OFF-state of the OBD.

8. The method of claim 7, wherein the lapse of time after operation is 15 minutes, the driving distance after operation is 40 km, and the temperature at the inlet of the turbocharger and the EGR gas outlet is 200 degrees or more.

9. The method of claim 6, wherein the condition that the temperature of the gas is not rapidly increased at the outlet of the EGR cooler even when the ECB V/V is operated includes an opening amount of 0% with the EGR valve turned off, operation of a brake, and coasting, and
a gap of the automatic operation is set in a time unit of seconds.

10. The method of claim 6, wherein in the performing the automatic ECB V/V self-cleaning mode after checking the third necessary condition, the ECB V/V self-cleaning mode includes:
repeating turning on/off the ECB V/V;
operating a solenoid valve of the ECB V/V; and
stopping after a normal mode setting condition is reached, wherein a time of the reaching of the normal mode setting condition is determined in a unit of seconds and the time is two seconds.

11. The method of claim 6, wherein the accumulation of operation conditions includes lapse of time or a driving distance, the lapse of time is 15 to 20 minutes, and the driving distance is 50 km.

12. The method of claim 6, wherein in the performing the forcible ECB V/V self-cleaning mode after checking the fourth necessary condition, the forcible ECB V/V self-cleaning mode includes:
repeating turning on/off the ECB V/V;
operating a solenoid valve of the ECB V/V; and
stopping after a normal mode setting condition is reached, wherein the reaching the normal mode setting condition is determined in a time unit of minutes or a driving distance, the minute is 15 to 20 minutes, and the driving distance is 50 km.

13. The method of claim 1, wherein the continuous performing of the ECB V/V sticking detection mode detects an EGR gas outlet temperature, determines thermal deterioration at an intake side when the EGR gas outlet temperature is greater than a temperature of determining open sticking, and provides an open sticking signal to the ECU or turns on a check lamp when thermal deterioration at the intake side is determined.

14. The method of claim 13, wherein the EGR gas outlet temperature is provided from a temperature sensor value at the outlet of the EGR gas, or provided from a temperature value estimated from an intercooler outlet temperature sensor value stored as ECU data or a MAP sensor value.

15. The method of claim 1, wherein the cold performing of the ECB V/V sticking detection mode detects an EGR gas outlet temperature, determines there is a possibility of fouling of the EGR cooler, when the EGR gas outlet temperature is greater than a temperature of determining closed sticking, and provides a closed sticking signal to the ECU or turns on a check lamp when the fouling of the EGR cooler is determined.

16. The method of claim 15, wherein the EGR gas outlet temperature is provided from an EGR gas outlet temperature sensor value or provided from a temperature value estimated from an intercooler outlet temperature sensor value stored as ECU data or a MAP sensor value, and
the temperature of determining closed sticking is determined from temperature of cooling water, intake temperature, engine load, or an amount of fuel, an opening amount of EGR (%), and a turbocharger inlet temperature.

17. The method of claim 1, wherein the in-driving performing of the ECB V/V sticking detection mode checks an operation condition; determines that an engine is in a quasi-steady state; checks the operation state of the ECB V/V for a predetermined time $t_{Op}$ when the quasi-steady state is satisfied; checks whether it is in the quasi-steady state after checking the operation state of the ECB V/V; checks a temperature change from a temperature difference before and after the ECB V/V is operated, on a basis of a temperature difference before and after the ECB V/V is operated being greater than a reference temperature before and after the ECB V/V is operated, when the quasi-steady state is maintained; and provides a middle sticking signal to the ECU or turns on a check lamp, when the temperature difference before and after the ECB V/V is operated is checked.

18. The method of claim 17, wherein in the determining a quasi-steady state, a change (%) of the opening amount of an EGR valve, a change in an amount of fuel, a change in exhaust temperature, a change in a pressed amount of an accelerator pedal, a change in RPM of an engine, a change in temperature of cooling water, a braking state of a vehicle, a limit (OFF) of OBD, and an EGR gas outlet temperature are included,
the predetermined time $t_{Op}$ is in a unit of seconds, and
an RPM of the engine, the temperature of cooling water, an engine load, an EGR use condition, operation of the ECB V/V, and the exhaust temperature are used for determining the reference temperature before and after the ECB V/V is operated.

19. The method of claim 17, wherein in the checking whether it is in the quasi-steady state after checking the operation state of the ECB V/V, when the quasi-steady state is not maintained, determination of the quasi-steady state is reattempted in a unit of minutes, and
when a temperature change is checked on the basis of the temperature difference before and after the ECB V/V is operated, a delay time is applied.

20. A controller for an exhaust gas recirculation system for preventing a valve from sticking, the controller comprising:
an EGR (Exhaust Gas Recirculation) Cooler By-Pass Valve (ECB V/V) normal mode performing device for operating an ECB V/V under a low temperature and low load condition to prevent fouling of an EGR cooler and overcooling of an EGR gas, when an EGR is controlled with a vehicle driven;
an ECB V/V self-cleaning mode performing device for operating an ECB V/V in consideration of an engine condition when an OFF-state of the ECB V/V is determined; and
an ECB V/V sticking detection mode performing device for detecting sticking of the ECB V/V in the types of continuous performing, cold performing, and in-driving performing in consideration of the opening amount of the ECB V/V when a fixed state of the ECB V/V is determined.

21. The controller of claim 20, wherein the ECB V/V normal mode performing device is configured to receive the temperature of cooling water and the amount of fuel for determining a cold/low load condition of the engine;
the ECB V/V self-cleaning mode performing device is configured to receive system data including an operation signal of an EGR valve, temperature of a turbocharger, EGR gas outlet temperature, an operation signal of an ECB V/V, and a failure of EGR, and OBD data including a limit (OFF) of OBD, and the ECB V/V sticking detection mode performing device is configured to determine open sticking, close sticking, and middle sticking according to a fixed state of the ECB V/V, using quasi-stead state data of an engine operation condition to which a change (%) in the opening amount of an EGR valve, a change in the amount of fuel, a change in exhaust gas, a change in the pressed amount of an accelerator pedal, a change in RPM of an engine, and a change in temperature of cooling water are applied, and temperature data, and wherein the open sticking indicates that the ECB V/V is open and fixed, the close sticking indicates that the ECB V/V is closed and stuck, or not operated, and the middle sticking indicates that the ECB V/V is fixed at a middle position.

22. The controller of claim 20, wherein the controller is an Engine Control Unit (ECU) for controlling an engine.

* * * * *